United States Patent
Kamino et al.

(10) Patent No.: US 11,771,959 B2
(45) Date of Patent: *Oct. 3, 2023

(54) GOLF BALL

(71) Applicant: SUMITOMO RUBBER INDUSTRIES, LTD., Kobe (JP)

(72) Inventors: Kazuya Kamino, Kobe (JP); Hidetaka Inoue, Kobe (JP); Kuniyasu Horiuchi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 203 days.

This patent is subject to a terminal disclaimer.

(21) Appl. No.: 17/351,514

(22) Filed: Jun. 18, 2021

(65) Prior Publication Data

US 2021/0308531 A1  Oct. 7, 2021

Related U.S. Application Data

(63) Continuation of application No. 16/526,438, filed on Jul. 30, 2019, now Pat. No. 11,065,509.

(30) Foreign Application Priority Data

Jul. 31, 2018 (JP) .................... 2018-143746

(51) Int. Cl.
| | |
|---|---|
| A63B 37/00 | (2006.01) |
| C09D 175/08 | (2006.01) |
| C08K 3/36 | (2006.01) |
| C09D 7/61 | (2018.01) |
| C09D 175/04 | (2006.01) |

(52) U.S. Cl.
CPC .... *A63B 37/00221* (2020.08); *A63B 37/0024* (2013.01); *A63B 37/0029* (2013.01); *A63B 37/00222* (2020.08); *C09D 7/61* (2018.01); *C09D 175/04* (2013.01); *C09D 175/08* (2013.01); *C08K 3/36* (2013.01)

(58) Field of Classification Search
None
See application file for complete search history.

(56) References Cited

U.S. PATENT DOCUMENTS

| | | | |
|---|---|---|---|
| 5,435,839 A | 7/1995 | Ogawa | |
| 10,723,911 B2 | 7/2020 | Kamino et al. | |
| 11,065,509 B2 * | 7/2021 | Kamino | ............ C08G 18/6677 |
| 11,235,203 B2 * | 2/2022 | Horiuchi | .............. C08G 18/755 |
| 11,235,204 B2 * | 2/2022 | Horiuchi | .............. C09D 175/08 |
| 11,369,845 B2 * | 6/2022 | Kamino | ............ C08G 18/4854 |
| 2006/0030428 A1 | 2/2006 | Ohira | |
| 2011/0224024 A1 | 9/2011 | Tutmark | |
| 2013/0165271 A1 | 6/2013 | Lee | |
| 2015/0182804 A1 | 7/2015 | Tarao et al. | |
| 2015/0258705 A1 | 9/2015 | Hirata | |
| 2017/0056731 A1 | 3/2017 | Tarao et al. | |
| 2017/0165527 A1 | 6/2017 | Inoue et al. | |
| 2018/0093137 A1 | 4/2018 | Park et al. | |
| 2018/0147451 A1 | 5/2018 | Kamino et al. | |
| 2020/0306592 A1 | 10/2020 | Horiuchi et al. | |
| 2020/0306593 A1 | 10/2020 | Horiuchi et al. | |
| 2020/0308441 A1 | 10/2020 | Kamino et al. | |

FOREIGN PATENT DOCUMENTS

| | | |
|---|---|---|
| JP | 2001-214131 A | 8/2001 |
| JP | 2013-521870 A | 6/2013 |
| JP | 2015-503400 A | 2/2015 |

OTHER PUBLICATIONS

Extended European Search Report for European Application No. 19185255.7, dated Feb. 2, 2020.
Nipsil Precipitated Silica brochure, Tosoh Silica Corporation (2019) pp. 1-16.
Nissan Chemical Organosilicaol product literature (2007) pp. 1-2.

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having improved ball speed or aerodynamic performance on a rainy day or the like by controlling the formulation of the paint film. The present invention provides a golf ball comprising a golf ball body and a paint film covering the golf ball body, wherein a paint film surface of the golf ball has a water contact angle A1 of 70° or more and a water sliding angle B1 of less than 50°. The present invention also provides a golf ball comprising a golf ball body and a paint film covering the golf ball body, wherein when a sheet consisting of a slab formed from a composition constituting a golf ball body surface and a coating film formed by applying a paint constituting the paint film on the slab is prepared, a coating film surface of the sheet has a water contact angle A2 of 90° or more and a water sliding angle B2 of less than 52°.

20 Claims, 2 Drawing Sheets

GOLF BALL

CROSS-REFERENCE TO RELATED APPLICATIONS

This application is a Continuation of U.S. application Ser. No. 16/526,438, filed on Jul. 30, 2019, U.S. Pat. No. 11,065,509 which claims priority under 35 U.S.C. § 119(a) to Application No. 2018-143746, filed in Japan on Jul. 31, 2018, all of which are hereby expressly incorporated by reference into the present application.

FIELD OF THE INVENTION

The present invention relates to a golf ball, particularly a paint film of a golf ball.

DESCRIPTION OF THE RELATED ART

Conventionally, a golf ball has a paint film formed on a surface of a golf ball body. The paint film contributes to the performance, quality, appearance, etc. of the golf ball. Among them, regarding the performance of the golf ball, since the paint film generally has a very thin thickness, it is considered that the paint film primarily contributes to the performance on weak shot such as approach shots.

It has been discussed to improve the performance of the golf ball by changing the composition of the paint film. For example, JP 2015-503400 A discloses a golf ball comprising a core and a cover layer substantially surrounding the core, wherein the cover layer includes at least one dimple and at least one land region adjacent to the at least one dimple, and a part of the golf ball surface is hydrophobic and a part of the golf ball surface is hydrophilic.

JP 2013-521870 A discloses a golf ball comprising a golf ball body with an outer surface having a plurality of dimples formed thereon, and a protection coating painted on the outer surface of the golf ball body and containing a hydrophobic thermoplastic polyurethane. In addition, JP 2001-214131 A discloses a golf ball clear paint containing an organic silicone compound.

SUMMARY OF THE INVENTION

As noted above, the paint film of the golf ball has been discussed. However, it was considered that the paint film merely contributed to the performance of the spin rate at hitting, the quality improvement in contamination or the like, and the appearance. Herein, although the flight distance on driver shots or the like decreases on a rainy day, such problem was not particularly resolved, and the influence of the paint film on the ball speed or aerodynamic performance on a rainy day was not discussed. The present invention has been achieved in view of the above problems. An object of the present invention is to provide a golf ball having improved ball speed or aerodynamic performance on a rainy day or the like by controlling the paint film composition.

The golf ball according to the first embodiment that has solved the above problems has a golf ball body and a paint film covering the golf ball body, wherein a paint film surface of the golf ball has a water contact angle A1 of 70° or more and a water sliding angle B1 of less than 50°. In addition, the golf ball according to the second embodiment has a golf ball body and a paint film covering the golf ball body, wherein when a sheet consisting of a slab formed from a composition constituting a golf ball body surface and a coating film formed by applying a paint constituting the paint film on the slab is prepared, a coating film surface of the sheet has a water contact angle A2 of 90° or more and a water sliding angle B2 of less than 52°.

If the water contact angle A1 and water sliding angle B1 of the paint film surface of the golf ball, or the water contact angle A2 and water sliding angle B2 of the coating film surface of the sheet fall within the above range, water on the golf ball surface can be blown off immediately on the shot under a condition that water exists on the golf ball surface, such as a rainy day. Thus, it is possible to impart a high ball speed and good aerodynamic performance to a golf ball.

According to the present invention, a golf ball having excellent ball speed or aerodynamic performance on a rainy day or the like is obtained.

DESCRIPTION OF THE PREFERRED EMBODIMENT

Figure 1:
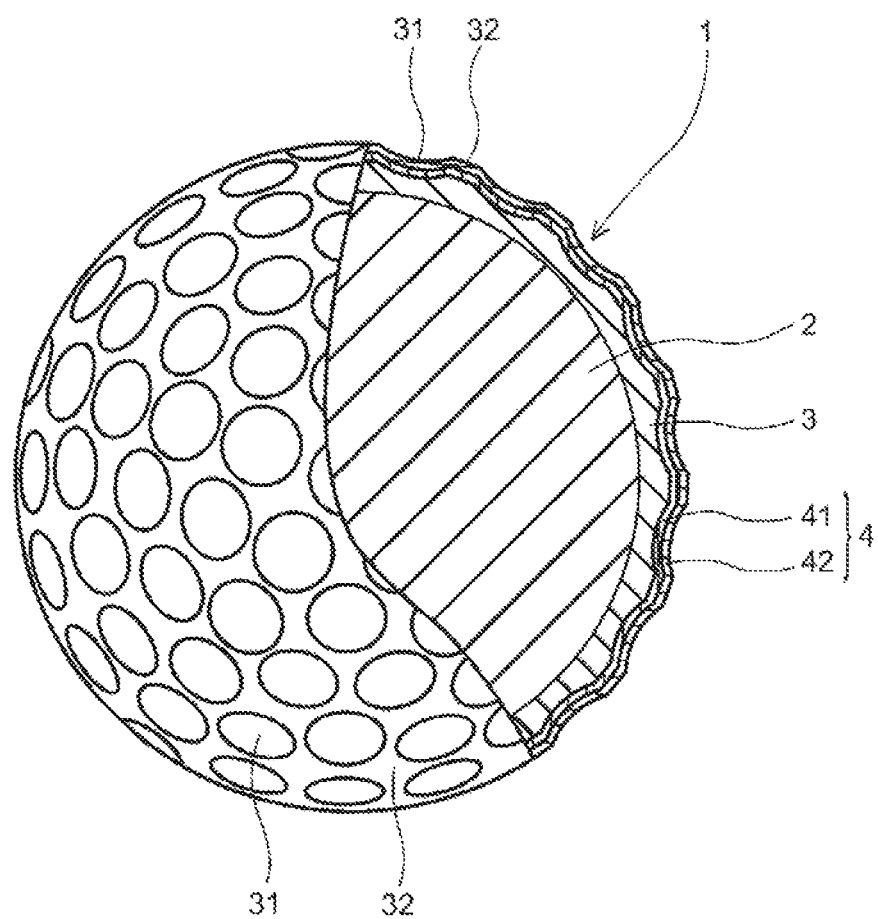
FIG. 1 is a partially cutaway cross-sectional view of a golf ball according to one embodiment of the present invention.

The golf ball according to the first embodiment of the present invention has a golf ball body and a paint film covering the golf ball body, wherein a paint film surface of the golf ball has a water contact angle A1 of 70° or more and a water sliding angle B1 of less than 50°. In addition, the golf ball according to the second embodiment has a golf ball body and a paint film covering the golf ball body, wherein when a sheet consisting of a slab formed from a composition constituting a golf ball body surface and a coating film formed by applying a paint constituting the paint film on the slab is prepared, a coating film surface of the sheet has a water contact angle A2 of 90° or more and a water sliding angle B2 of less than 52°. If the water contact angle A1 and water sliding angle B1 of the paint film surface of the golf ball, or the water contact angle A2 and water sliding angle B2 of the coating film surface of the sheet fall within the above range, water on the golf ball surface can be blown off immediately on the shot under a condition that water exists on the golf ball surface, such as a rainy day. Thus, it is possible to impart a high ball speed and good aerodynamic performance to a golf ball.

The First Embodiment

The water contact angle A1 of the paint film surface of the golf ball is preferably 70° or more, more preferably 75° or more, and even more preferably 80° or more. If the water contact angle A1 is 70° or more, the water-discharging effect in the flight on a rainy day is greater. The upper limit of the water contact angle A1 is not particularly limited, but it is generally about 90°. The contact angle is an angel (an angel inside liquid) between a liquid and a solid surface when free surface of a static liquid contacts a solid wall.

The water sliding angle B1 of the paint film surface of the golf ball is preferably less than 50°, more preferably 45° or less, and even more preferably 40° or less. If the water sliding angle B1 is less than 50°, the water-discharging effect in the flight on a rainy day is greater. The lower limit of the water sliding angle B1 is not particularly limited, but it is generally 10°. The sliding angle is a tilt angle at which a liquid begins to slide downward when a solid sample having a level solid surface on which a static liquid exists, is slowly tilted.

The adhesion energy of the paint film surface of the golf ball is preferably less than 10 mJ/m$^2$, more preferably 9 mJ/m$^2$ or less, and even more preferably 8 mJ/m$^2$ or less. If the adhesion energy is less than 10 mJ/m$^2$, the water-discharging effect in the flight on a rainy day is greater. The lower limit of the adhesion energy is not particularly limited, but it is generally 4 mJ/m$^2$.

The Second Embodiment

The physical properties of the paint film surface of the golf ball can also be evaluated by using a sheet prepared from a composition constituting the golf ball body surface and a golf ball paint. In other words, a sheet consisting of a slab formed from a composition constituting the golf ball body surface and a coating film formed by applying a paint constituting the paint film to the slab is prepared, and this sheet is used for the evaluation.

The method of preparing the sheet will be explained. Firstly, a slab is formed from a composition constituting the golf ball body surface. The composition constituting the golf ball body surface is a composition constituting the golf ball body in case of a one-piece golf ball, and is a composition constituting the outermost cover of the golf ball in case of a golf ball composed of two or more pieces. The slab is prepared from the composition constituting the golf ball body surface under the same condition as that for preparing the golf ball. It is noted that the thickness of the slab is at least 2 mm. Subsequently, a paint is applied to the slab to form a coating film. The coating film is formed under the same condition as that for forming the paint film, and has the same thickness as the paint film.

The water contact angle A2 of the coating film surface of the sheet is preferably 90° or more, more preferably 95° or more, and even more preferably 100° or more. If the water contact angle A2 is 90° or more, the water-discharging effect in the flight on a rainy day is greater. The upper limit of the water contact angle A2 is not particularly limited, but it is generally 110°.

The water sliding angle B2 of the coating film surface of the sheet is preferably less than 52°, more preferably 48° or less, and even more preferably 45° or less. If the water sliding angle B2 is less than 52°, the water-discharging effect in the flight on a rainy day is greater. The lower limit of the water sliding angle B2 is not particularly limited, but it is generally 15°.

First Embodiment and Second Embodiment

The indentation depth of the paint film measured with a nanoindenter is preferably 300 nm or more, more preferably 400 nm or more, and even more preferably 500 nm or more, and is preferably 4000 nm or less, more preferably 3900 nm or less, and even more preferably 3800 nm or less. The indentation depth measured with the nanoindenter directly indicates the physical properties of the paint film formed on the golf ball body. If the indentation depth of the paint film measured with the nanoindenter is 300 nm or more, the spin rate on approach shots increases, and if the indentation depth of the paint film measured with the nanoindenter is 4000 nm or less, the stain resistance becomes better.

The water contact angle, water sliding angle, adhesion energy, and indentation depth can be adjusted by controlling the type and amount of the resin component, silicon-containing filler, etc. of the paint film which will be described later.

The thickness of the paint film is preferably 5 μm or more, more preferably 7 μm or more, and even more preferably 9 μm or more, and is preferably 50 μm or less, more preferably 45 μm or less, and even more preferably 40 μm or less. If the thickness is 5 μm or more, the spin rate on approach shots increases, and if the thickness is 50 μm or less, the spin rate on driver shots can be suppressed. It is noted that in the case that the paint film has a multi-layered structure, the total thickness of all the layers preferably falls within the above range. The method for measuring the thickness of the paint film will be described later.

(Base Resin)

Examples of the base resin constituting the paint film include a urethane resin, an epoxy resin, an acrylic resin, a vinyl acetate resin, and a polyester resin. Among them, the urethane resin is preferred. If the base resin constituting the paint film is the urethane resin, physical properties of the paint film can be easily obtained by adjusting an amount of a polyol composition or polyisocyanate composition, or a mixing ratio thereof. It is noted that in the case that the paint film has a multi-layered structure, each layer thereof may be formed from a different resin, but the base resin constituting all the layers is preferably the urethane resin.

(Polyurethane Paint)

The paint film is preferably formed from a paint containing a polyol composition and a polyisocyanate composition. As the paint, a so-called two-component curing type urethane paint containing a polyol as a base material and a polyisocyanate as a curing agent can be exemplified.

(Polyol Composition)

The polyol composition contains a polyol compound. Examples of the polyol compound include a compound having two or more hydroxyl groups in the molecule. Examples of the polyol compound include a compound having a hydroxyl group at a terminal of the molecule, and a compound having a hydroxyl group at a location other than a terminal of the molecule. The polyol compound may be used solely or as a mixture of at least two of them.

Examples of the compound having a hydroxyl group at a terminal of the molecule include a low molecular weight polyol having a molecular weight of less than 500, and a high molecular weight polyol having a number average molecular weight of 500 or more. Examples of the low molecular weight polyol include a diol such as ethylene glycol, diethylene glycol, triethylene glycol, 1,3-butanediol, 1,4-butanediol, neopentyl glycol, and 1,6-hexanediol, and a triol such as glycerin, trimethylolpropane, and hexanetriol. Examples of the high molecular weight polyol include a polyether polyol, a polyester polyol, a polycaprolactone polyol, a polycarbonate polyol, a urethane polyol, and an acrylic polyol. Examples of the polyether polyol include polyoxyethylene glycol (PEG), polyoxypropylene glycol (PPG), and polyoxytetramethylene glycol (PTMG). Examples of the polyester polyol include polyethylene adipate (PEA), polybutylene adipate (PBA), and polyhexamethylene adipate (PHMA). Examples of the polycaprolactone polyol include poly-ε-caprolactone (PCL). Examples of the polycarbonate polyol include polyhexamethylene carbonate.

The urethane polyol is a compound having a plurality of urethane bonds in the molecule, and having two or more hydroxyl groups in one molecule. Examples of the urethane polyol include a urethane prepolymer obtained by a reaction between a first polyol component and a first polyisocyanate component, under a condition that the amount of hydroxyl groups in the first polyol component is excessive to the amount of isocyanate groups in the first polyisocyanate component.

Examples of the first polyol component constituting the urethane polyol include a polyether diol, a polyester diol, a polycaprolactone diol and a polycarbonate diol. The polyether diol is preferred. Examples of the polyether diol include polyoxyethylene glycol, polyoxypropylene glycol, and polyoxytetramethylene glycol. Among them, the polyoxytetramethylene glycol is preferred.

The number average molecular weight of the polyether diol is preferably 500 or more, more preferably 600 or more, and is preferably 4,000 or less, more preferably 3,500 or less, and even more preferably 3,000 or less. If the number average molecular weight of the polyether diol is 500 or more, the distance between crosslinking points in the paint film becomes long, the paint film becomes soft, and thus the spin performance is enhanced. If the number average molecular weight of the polyether diol is 4,000 or less, the distance between crosslinking points in the paint film does not become excessively long, and thus the stain resistance of the paint film becomes better. It is noted that the number average molecular weight of the polyol component can be measured, for example, by gel permeation chromatography (GPC), using polystyrene as a standard material, tetrahydrofuran as an eluate, and an organic solvent system GPC column (e.g. "Shodex (registered trademark) KF series" available from Showa Denko K.K.) as a column.

The first polyol component may contain a low molecular weight polyol having a molecular weight of less than 500. Examples of the low molecular weight polyol include a diol such as ethylene glycol, diethylene glycol, triethylene glycol, 1,3-butanediol, 1,4-butanediol, neopentyl glycol, and 1,6-hexanediol, and a triol such as glycerin, trimethylolpropane, and hexanetriol. The low molecular weight polyol may be used solely or as a mixture of at least two of them.

The first polyol component of the urethane polyol preferably contains the triol component and the diol component. As the triol component, trimethylolpropane is preferred. The mixing ratio (triol component/diol component) of the triol component to the diol component is preferably 0.2 or more, more preferably 0.5 or more, and is preferably 6.0 or less, more preferably 5.0 or less in a molar ratio.

The first polyisocyanate component constituting the urethane polyol is not particularly limited, as long as it has two or more isocyanate groups. Examples of the first polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylene diisocyanate (TMXDI), and para-phenylene diisocyanate (PPDI); and an alicyclic polyisocyanate or aliphatic polyisocyanate such as 4,4'-dicyclohexylmethane diisocyanate ($H_{12}MDI$), hydrogenated xylylene diisocyanate ($H_6XDI$), hexamethylene diisocyanate (HDI), isophorone diisocyanate (IPDI), and norbornene diisocyanate (NBDI). These polyisocyanates may be used solely, or at least two of them may be used in combination.

The amount of the polyether diol in the urethane polyol is preferably 70 mass % or more, more preferably 72 mass % or more, and even more preferably 75 mass % or more. The polyether diol forms a soft segment in the paint film. Therefore, if the amount of the polyether diol is 70 mass % or more, the obtained golf ball has further enhanced spin performance.

The weight average molecular weight of the urethane polyol is preferably 5,000 or more, more preferably 5,300 or more, and even more preferably 5,500 or more, and is preferably 20,000 or less, more preferably 18,000 or less, and even more preferably 16,000 or less. If the weight average molecular weight of the urethane polyol is 5,000 or more, the distance between crosslinking points in the paint film becomes long, the paint film becomes soft, and thus the spin performance is enhanced. If the weight average molecular weight of the urethane polyol is 20,000 or less, the distance between crosslinking points in the paint film does not become excessively long, and thus the stain resistance of the paint film becomes better.

The hydroxyl value of the urethane polyol is preferably 10 mgKOH/g or more, more preferably 15 mgKOH/g or more, and even more preferably 20 mgKOH/g or more, and is preferably 200 mgKOH/g or less, more preferably 190 mgKOH/g or less, and even more preferably 180 mgKOH/g or less. It is noted that the hydroxyl value can be measured by, for example, an acetylization method, in accordance with JIS K 1557-1.

Examples of the compound having a hydroxyl group at a location other than a terminal of the molecule include a modified polyrotaxane having a hydroxyl group, and a hydroxyl group modified vinyl chloride-vinyl acetate copolymer.

The modified polyrotaxane having a hydroxyl group has a cyclodextrin, a linear molecule piercing through the cyclic structure of the cyclodextrin, and blocking groups located at both terminals of the linear molecule to prevent disassociation of the cyclodextrin. The polyrotaxane is viscoelastic, since the cyclodextrin molecule is movable along the linear molecule that pierces through the cyclodextrin in a skewering manner (pulley effect). Even if a tension is applied to the polyrotaxane, the tension can be uniformly dispersed due to the pulley effect. Thus, the polyrotaxane has an excellent property that a crack or flaw very hardly occurs, unlike a conventional crosslinked polymer.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and the α-cyclodextrin is preferable. As the cyclodextrin, one type may be used solely, and two or more types may be used in combination.

The linear molecule is not particularly limited, as long as it is a linear molecule capable of piercing through the cyclic structure of the cyclodextrin so that the cyclic structure of the cyclodextrin is movable along and rotatable around the linear molecule. Examples of the linear molecule include polyalkylene, polyester, polyether, and polyacrylic acid. Among them, the polyether is preferable, polyethylene glycol is particularly preferable. Polyethylene glycol has less steric hindrance, and thus can easily pierce through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has functional groups at both terminals thereof. If the linear molecule has the functional group, the linear molecule can easily react with the blocking group. Examples of the functional group include a hydroxyl group, carboxyl group, amino group, and thiol group.

The blocking groups are not particularly limited, as long as the blocking groups are located at both terminals of the linear molecule to prevent the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrin kept along the linear molecule (kept amount) preferably ranges from 0.06 to 0.61, more preferably ranges from 0.11 to 0.48, and even more preferably ranges from 0.24 to 0.41, if the maximum kept amount is deemed as 1. If the kept amount is less than 0.06, the pulley effect may not be exerted, and if the kept amount exceeds 0.61, the cyclodextrin is so densely located that the movability of the cyclodextrin may decrease.

The polyrotaxane is preferably a polyrotaxane having at least a part of hydroxyl groups of the cyclodextrin being modified with a caprolactone chain. Modifying with the caprolactone chain alleviates the steric hindrance between the polyrotaxane and the polyisocyanate, thereby enhancing the reactive efficiency with the polyisocyanate.

The above modification is carried out, for example, by treating the hydroxyl groups of the cyclodextrin with propylene oxide to hydroxylpropylate the cyclodextrin, followed by adding ε-caprolactone to perform ring-opening polymerization. As a result of this modification, the caprolactone chain —(CO(CH$_2$)$_5$O)nH (n is a natural number ranging from 1 to 100) is linked to the exterior side of the cyclic structure of the cyclodextrin via —O—C$_3$H$_6$—O— group. The above "n" represents the degree of polymerization, and is preferably a natural number ranging from 1 to 100, more preferably a natural number ranging from 2 to 70, and even more preferably a natural number ranging from 3 to 40. At another terminal of the caprolactone chain, a hydroxyl group is formed through the ring-opening polymerization. The terminal hydroxyl group of the caprolactone chain can react with the polyisocyanate.

The ratio of the hydroxyl groups modified with the caprolactone chain to all the hydroxyl groups (100 mole %) included in the cyclodextrin before the modification is preferably 2 mole % or more, more preferably 5 mole % or more, and even more preferably 10 mole % or more. If the ratio of the hydroxyl groups modified with the caprolactone chain falls within the above range, the polyrotaxane has greater hydrophobicity and hence has better reactivity with the polyisocyanate.

The hydroxyl value of the polyrotaxane is preferably 10 mgKOH/g or more, more preferably 15 mgKOH/g or more, and even more preferably 20 mgKOH/g or more, and is preferably 400 mgKOH/g or less, more preferably 300 mgKOH/g or less, even more preferably 220 mgKOH/g or less, and most preferably 180 mgKOH/g or less. If the hydroxyl value of the polyrotaxane falls within the above range, the polyrotaxane has better reactivity with the polyisocyanate, and thus the paint film has better durability.

The total molecular weight of the polyrotaxane is preferably 30,000 or more, more preferably 40,000 or more, and even more preferably 50,000 or more, and is preferably 3,000,000 or less, more preferably 2,500,000 or less, and even more preferably 2,000,000 or less, in a weight average molecular weight. If the weight average molecular weight is 30,000 or more, the paint film has sufficient strength, and if the weight average molecular weight is 3,000,000 or less, the paint film is sufficiently soft, and thus the golf ball has enhanced approach performance. It is noted that the weight average molecular weight of the polyrotaxane can be measured, for example, by gel permeation chromatography (GPC), using polystyrene as a standard material, tetrahydrofuran as an eluate, and an organic solvent system GPC column (e.g. "Shodex (registered trademark) KF series" available from Showa Denko K.K.) as a column.

Specific examples of the polycaprolactone-modified polyrotaxane include SeRM super polymer SH3400P, SH2400P, and SH1310P available from Advanced Softmaterials Inc.

The hydroxyl group-modified vinyl chloride-vinyl acetate copolymer can adjust the adhesion while maintaining the scuff resistance of the paint film. The hydroxyl group-modified vinyl chloride-vinyl acetate copolymer can be obtained, for example, by a method of copolymerizing vinyl chloride, vinyl acetate and a monomer having a hydroxyl group (e.g. polyvinyl alcohol, hydroxyalkyl acrylate); or by a method of partially or fully saponifying a vinyl chloride-vinyl acetate copolymer.

In the hydroxyl group-modified vinyl chloride-vinyl acetate copolymer, the amount of the vinyl chloride component is preferably 1 mass % or more, more preferably 20 mass % or more, and even more preferably 50 mass % or more, and is preferably 99 mass % or less, more preferably 95 mass % or less. Specific examples of the hydroxyl group-modified vinyl chloride-vinyl acetate copolymer include Solbin (registered trademark) A, Solbin AL and Solbin TA3 available from Nissin Chemical Industry Co., Ltd.

Preferable examples of the polyol composition include an embodiment containing the urethane polyol including the polyether diol having a number average molecular weight in a range from 600 to 3000 as a constituent component (first embodiment); and an embodiment containing the polyrotaxane having the cyclodextrin, the linear molecule piercing through the cyclic structure of the cyclodextrin, and the blocking groups located at both terminals of the linear molecule to prevent disassociation of the cyclodextrin, wherein at least a part of hydroxyl groups of the cyclodextrin is modified with the caprolactone chain via the —O—C$_3$H$_6$—O— group (second embodiment).

In the polyol composition according to the first embodiment, the amount of the urethane polyol in the polyol compound contained in the polyol composition is preferably 60 mass % or more, more preferably 70 mass % or more, and even more preferably 80 mass % or more. The polyol compound of the polyol composition according to the first embodiment also preferably consists of the urethane polyol.

In the polyol composition according to the second embodiment, the amount of the polyrotaxane in the polyol compound contained in the polyol composition is preferably 10 mass % or more, more preferably 15 mass % or more, and even more preferably 20 mass % or more, and is preferably 100 mass % or less, more preferably 90 mass % or less, and even more preferably 85 mass % or less.

The polyol composition according to the second embodiment preferably contains the polycaprolactone polyol. The mass ratio (polycaprolactone polyol/polyrotaxane) of the polycaprolactone polyol to the polyrotaxane is preferably 0/100 or more, more preferably 5/95 or more, and even more preferably 10/90 or more, and is preferably 90/10 or less, more preferably 85/15 or less, and even more preferably 80/20 or less.

The polyol composition according to the second embodiment preferably contains the hydroxyl group-modified vinyl chloride-vinyl acetate copolymer. The amount of the hydroxyl group-modified vinyl chloride-vinyl acetate copolymer in the polyol compound contained in the polyol composition is preferably 4 mass % or more, more preferably 8 mass % or more, and is preferably 50 mass % or less, more preferably 45 mass % or less.

(Polyisocyanate Composition)

Next, the polyisocyanate composition will be explained. The polyisocyanate composition contains a polyisocyanate compound. Examples of the polyisocyanate compound include a compound having two or more isocyanate groups.

Examples of the polyisocyanate compound include an aromatic diisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylene diisocyanate (TMXDI), and para-phenylene diisocyanate (PPDI); an alicyclic diisocyanate or aliphatic diisocyanate such as 4,4'-dicyclohexylmethane diisocyanate ($H_{12}MDI$), hydrogenated xylylene diisocyanate ($H_6XDI$), hexamethylene diisocyanate (HDI), isophorone diisocyanate (IPDI), and norbornene diisocyanate (NBDI); and a triisocyanate such as an allophanate-modified product, a biuret-modified product, an isocyanurate-modified product and an adduct product of the above diisocyanates. The polyisocyanate may be used solely, or at least two of them may be used in combination.

The allophanate-modified product is, for example, a triisocyanate obtained by further reacting a diisocyanate with a urethane bond formed through a reaction between a diisocyanate and a low molecular weight diol. The adduct product is a triisocyanate obtained through a reaction between a diisocyanate and a low molecular weight triol such as trimethylolpropane or glycerin. The biuret-modified product is, for example, a triisocyanate having a biuret bond represented by the following chemical formula (1). The isocyanurate-modified product of the diisocyanate is, for example, a triisocyanate represented by the following chemical formula (2).

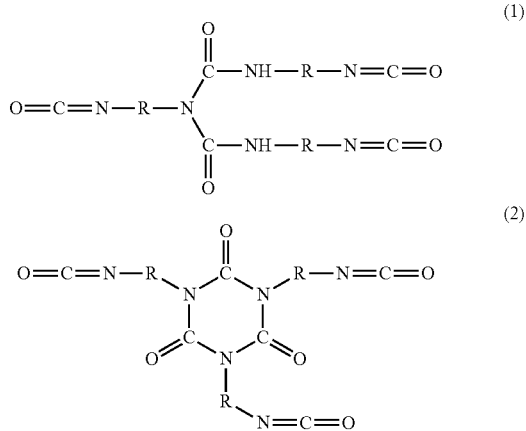

In the chemical formulae (1) and (2), R represents a residue where isocyanate groups are removed from the diisocyanate.

Preferable examples of the triisocyanate include an isocyanurate-modified product of hexamethylene diisocyanate, a biuret-modified product of hexamethylene diisocyanate, and an isocyanurate-modified product of isophorone diisocyanate.

In the present invention, the polyisocyanate composition preferably contains the triisocyanate compound. The amount of the triisocyanate compound in the polyisocyanate contained in the polyisocyanate composition is preferably 50 mass % or more, more preferably 60 mass % or more, and even more preferably 70 mass % or more. The polyisocyanate compound of the polyisocyanate composition most preferably consists of the triisocyanate compound.

The amount of the isocyanate group (NCO %) of the polyisocyanate contained in the polyisocyanate composition is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the amount of the isocyanate group (NCO %) of the polyisocyanate can be defined by 100×[mole number of isocyanate groups in the polyisocyanate×42 (molecular weight of NCO)]/[total mass (g) of the polyisocyanate].

Specific examples of the polyisocyanate include Burnock D-800, Burnock DN-950, and Burnock DN-955 available from DIC corporation; Desmodur N75MPA/X, Desmodur N3300, Desmodur L75 (C), and Sumidur E21-1 available from Sumika Bayer Urethane Co., Ltd.; Coronate HX and Coronate HK available from Nippon Polyurethane Industry Co., Ltd.; Duranate 24A-100, Duranate 21S-75E, Duranate TPA-100, and Durante TKA-100 available from Asahi Kasei Chemicals Corporation; and VESTANAT T1890 available from Degussa.

In the curing reaction of the curing type paint composition, the molar ratio (NCO group/OH group) of the isocyanate group (NCO group) in the curing agent to the hydroxyl group (OH group) in the base material is preferably 0.1 or more, more preferably 0.2 or more. If the molar ratio (NCO group/OH group) is less than 0.1, the curing reaction may be insufficient. In addition, if the molar ratio (NCO group/OH group) is excessively high, the amount of the isocyanate group is excessive, and the obtained paint film may become hard and fragile as well as the appearance of the obtained paint film may deteriorate. Thus, the molar ratio (NCO group/OH group) is preferably 1.5 or less, more preferably 1.4 or less, and even more preferably 1.3 or less. It is considered that the reason why the appearance of the obtained paint film deteriorates if the amount of the isocyanate group in the paint becomes excessive is that an excessive amount of the isocyanate group may promote a reaction between the moisture in the air and the isocyanate group, thereby generating a lot of carbon dioxide gas.

In case of using the polyol composition according to the first embodiment as the polyol composition, the polyisocyanate composition preferably contains the biuret-modified product of hexamethylene diisocyanate, the isocyanurate-modified product of hexamethylene diisocyanate and the isocyanurate-modified product of isophorone diisocyanate. In case of using the biuret-modified product and isocyanurate-modified product of hexamethylene diisocyanate in combination, the mixing ratio thereof (biuret-modified product/isocyanurate-modified product) preferably ranges from 20/40 to 40/20, more preferably ranges from 25/35 to 35/25 in a mass ratio.

In case of using the polyol composition according to the second embodiment as the polyol composition, the polyisocyanate composition preferably contains the isocyanurate-modified product and/or biuret-modified product of hexamethylene diisocyanate.

The paint may be either a waterborne paint mainly containing water as a dispersion medium or a solvent-based paint containing an organic solvent as a dispersion medium, and the solvent-based paint is preferred. In case of the solvent-based paint, preferable examples of the solvent include toluene, isopropyl alcohol, xylene, methyl ethyl ketone, methyl ethyl isobutyl ketone, ethylene glycol monomethyl ether, ethylbenzene, propylene glycol monomethyl ether, isobutyl alcohol, and ethyl acetate. It is noted that the solvent may be added into either the polyol composition or the polyisocyanate composition, and from the viewpoint of uniformly performing the curing reaction, the solvent is preferably added into both the polyol composition and the polyisocyanate composition.

The paint preferably further contains a modified silicone. If the modified silicone is included as a leveling agent, unevenness of the coated surface can be reduced, and thus a smooth coated surface can be formed on the surface of the golf ball. Examples of the modified silicone include a modified silicone having an organic group being introduced to a side chain or an end of a polysiloxane skeleton, a polysiloxane block copolymer obtained by copolymerizing a polyether block and/or a polycaprolactone block, etc. with a polysiloxane block, and a modified silicone having an organic group being introduced to a side chain or an end of the polysiloxane block copolymer. The polysiloxane skeleton or the polysiloxane block is preferably linear, and examples thereof include dimethyl polysiloxane, methylphenyl polysiloxane, and methyl hydrogen polysiloxane. Examples of the organic group include an amino group, epoxy group, mercapto group, and carbinol group. In the present invention, as the modified silicone oil, a polydimethylsiloxane-polycaprolactone block copolymer is preferably used, and a terminal carbinol-modified polydimethylsiloxane-polycaprolactone block copolymer is more preferably used. This is because these block copolymers have excellent compatibility with the caprolactone-modified polyrotaxane and the polycaprolactone polyol. Specific examples of the modified silicone used in the present invention include DBL-C31, DBE-224, and DCE-7521 manufactured by Gelest, Inc.

In the curing reaction, a conventional catalyst may be used. Examples of the catalyst include a monoamine such as triethylamine and N,N-dimethylcyclohexylamine; a polyamine such as N,N,N',N'-tetramethylethylene diamine and N,N,N',N'',N''-pentamethyldiethylene triamine; a cyclic diamine such as 1,8-diazabicyclo-[5.4.0]-7-undecene (DBU) and triethylenediamine; and a tin-based catalyst such as dibutyl tin dilaurylate and dibutyl tin diacetate. These catalysts may be used solely, or at least two of them may be used in combination. Among them, the tin-based catalyst such as dibutyl tin dilaurylate and dibutyl tin diacetate is preferable, and dibutyl tin dilaurylate is particularly preferable.

(Silicon-Containing Filler)

The paint film preferably contains a silicon-containing filler. If the silicon-containing filler is contained, the water sliding angle is easily controlled. In the case that the paint film has a multi-layered structure, the silicon-containing filler may be contained, without any limitation, in any layer, and the silicon-containing filler is preferably contained in at least the outermost layer of the paint film. The whole particle of the silicon-containing filler may exist inside the paint film, or alternatively a part of the particle of the silicon-containing filler may be exposed on the surface of the paint film. It is noted that it is preferable that the whole particle of the silicon-containing filler exists inside the paint film, i.e. the silicon-containing filler is not exposed on the surface of the paint film.

Examples of the silicon-containing filler include silicate mineral, aluminosilicate and radiolite (diatomite). Examples of the silicate mineral include talc and mica. Examples of the aluminosilicate include zeolite.

The silicon-containing filler is preferably a porous filler. The porous filler has many fine pores. The shape of the fine pore included in the porous filler is not particularly limited. The pore size of the fine pore included in the porous filler is not particularly limited, but it is preferably 500 nm or less.

The porous filler preferably contains $SiO_2$ as a constituent component in an amount of 50 mass % or more. If the amount of $SiO_2$ in the porous filler is 50 mass % or more, the paint film has enhanced water repellency, the spin performance on the shot under a wet condition is enhanced. The amount of $SiO_2$ in the constituent component of the porous filler is preferably 63 mass % or more, more preferably 65 mass % or more, and is 100 mass % or less, preferably 95 mass % or less, more preferably 90 mass % or less.

Examples of the porous filler include radiolite (diatomite), zeolite, and pearlite. The porous filler may be used solely, or two or more of them may be used in combination.

The volume average particle size of the silicon-containing filler is preferably 0.5 μm or more, more preferably 1 μm or more, and even more preferably 2 μm or more, and is preferably 30 μm or less, more preferably 20 μm or less, and even more preferably 15 μm or less. If the volume average particle size of the silicon-containing filler is 0.5 μm or more, the spin performance under a wet condition is enhanced due to the water-discharging effect, and if the volume average particle size of the silicon-containing filler is 30 μm or less, the appearance is better and stain can be prevented.

The ratio (d/T) of the volume average particle size (d) of the silicon-containing filler to the thickness (T) of the paint film containing the silicon-containing filler is preferably 0.01 or more, more preferably 0.05 or more, and even more preferably 0.1 or more, and is preferably 2.0 or less, more preferably 1.5 or less, and even more preferably 1.0 or less. If the ratio (d/T) is 0.01 or more, the water-discharging effect is greater and thus the spin performance under a wet condition is further enhanced, and if the ratio (d/T) is 2.0 or less, the appearance is better and stain attachment can be decreased.

The bulk density of the silicon-containing filler is preferably 0.2 g/cm$^3$ or more, more preferably 0.3 g/cm$^3$ or more, and is preferably 1.0 g/cm$^3$ or less, more preferably 0.9 g/cm$^3$ or less, and even more preferably 0.8 g/cm$^3$ or less.

In the case that the paint film contains the silicon-containing filler, the amount of the silicon-containing filler is preferably 20 parts by mass or more, more preferably 30 parts by mass or more, and even more preferably 40 parts by mass or more, and is preferably 200 parts by mass or less, more preferably 150 parts by mass or less, and even more preferably 120 parts by mass or less, with respect to 100 parts by mass of the base resin. If the amount of the silicon-containing filler is 20 parts by mass or more, the spin performance under a wet condition is enhanced due to the water-discharging effect, and if the amount of the silicon-containing filler is 200 parts by mass or less, lowering in the physical properties of the paint film can be prevented.

If necessary, the paint film may further contain an additive generally contained in a golf ball paint, such as an ultraviolet absorber, an antioxidant, a light stabilizer, a fluorescent brightener, an anti-blocking agent, a leveling agent, a slip agent, and a viscosity modifier.

(Formation of Paint Film)

Next, the method of applying the paint will be explained. The method of applying the paint is not particularly limited, and a conventional method, such as a spray coating method and an electrostatic coating method, may be employed.

In case of spray coating using an air gun, the polyol composition and the polyisocyanate composition may be fed with respective pumps and continuously mixed with a line mixer located in the stream line just before the air gun, and the obtained mixture is subjected to spray coating. Alternatively, the polyol composition and the polyisocyanate composition may be subjected to spray coating separately by using an air spray system provided with a mixing ratio controlling device. The paint application may be conducted by spray coating one time or overspraying several times.

The curing type paint applied to the golf ball body may be dried, for example, at a temperature ranging from 30° C. to 70° C. for 1 hour to 24 hours to form the paint film.

(Golf Ball)

The golf ball according to the present invention is not particularly limited, as long as it comprises a golf ball body and a paint film formed on a surface of the golf ball body. The construction of the golf ball body is not particularly limited, and may be a one-piece golf ball; a two-piece golf ball; a three-piece golf ball; a four-piece golf ball; a multi-piece golf ball comprising five or more pieces; or a wound golf ball. The present invention can be applied appropriately to any one of the above golf ball bodies.

(Core)

The one-piece golf ball body and the core used in a wound golf ball, two-piece golf ball and multi-piece golf ball will be explained.

The one-piece golf ball body and the core may be formed by using a conventional rubber composition (hereinafter, sometimes simply referred to as "core rubber composition"). For example, the one-piece golf ball body and the core may be formed by heat pressing a rubber composition containing a base rubber, a co-crosslinking agent, and a crosslinking initiator.

As the base rubber, particularly preferred is a high cis-polybutadiene having a cis-bond which is beneficial to the resilience in an amount of 40 mass % or more, preferably 70 mass % or more, and more preferably 90 mass % or more. As the co-crosslinking agent, an α,β-unsaturated carboxylic acid having 3 to 8 carbon atoms or a metal salt thereof is preferred, and acrylic acid metal salt and methacrylic acid metal salt are more preferred. As the metal constituting the metal salt, zinc, magnesium, calcium, aluminum and sodium are preferred, and zinc is more preferred. The amount of the co-crosslinking agent is preferably 20 parts by mass or more and 50 parts by mass or less with respect to 100 parts by mass of the base rubber. When the α,β-unsaturated carboxylic acid having 3 to 8 carbon atoms is used as the co-crosslinking agent, a metal compound (e.g. magnesium oxide) is preferably blended. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. Preferable examples of the organic sulfur compound include diphenyl disulfides (e.g. diphenyl disulfide, bis(pentabromophenyl) disulfide), thiophenols, and thionaphthols (e.g. 2-thionaphthol). The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferred. As the carboxylic acid, any one of an aliphatic carboxylic acid and an aromatic carboxylic acid (such as benzoic acid) may be used. The amount of the carboxylic acid and/or the salt thereof is 1 part by mass or more and 40 parts by mass or less with respect to 100 parts by mass of the base rubber.

The core rubber composition may further contain a weight adjusting agent such as zinc oxide and barium sulfate, an antioxidant, a colored powder, or the like appropriately, in addition to the base rubber, the co-crosslinking agent, the crosslinking initiator and the organic sulfur compound. Conditions for molding the core rubber composition by a heat pressing method may be set appropriately in accordance with the formulation of the core rubber composition. Generally, it is preferred that the core rubber composition is heated at 130° C. to 200° C. for 10 to 60 minutes, or alternatively the core rubber composition is subjected to a two-step heating, i.e. the core rubber composition is heated at 130° C. to 150° C. for 20 to 40 minutes and then heated at 160° C. to 180° C. for 5 to 15 minutes.

(Cover)

The golf ball body preferably comprises a core and a cover covering the core. In this case, the hardness of the cover is preferably 60 or less, more preferably 55 or less, even more preferably 50 or less, and most preferably 45 or less in Shore D hardness. If the hardness of the cover is 60 or less in Shore D hardness, the spin rate further increases. The lower limit of the hardness of the cover is not particularly limited, but it is preferably 10, more preferably 15, and even more preferably 20 in Shore D hardness. It is noted that the hardness of the cover is a slab hardness of the cover composition for forming the cover, which is molded into a sheet shape.

The thickness of the cover is preferably 0.1 mm or more, more preferably 0.2 mm or more, and even more preferably 0.3 mm or more, and is preferably 1.0 mm or less, more preferably 0.9 mm or less, and even more preferably 0.8 mm or less. If the thickness of the cover is 0.1 mm or more, the golf ball has better shot feeling, and if the thickness of the cover is 1.0 mm or less, the resilience of the golf ball can be maintained.

Examples of the resin component constituting the cover include, but are not limited to, various resins such as an ionomer resin, a polyester resin, a urethane resin and a polyamide resin; a thermoplastic polyamide elastomer having a trade name of "Pebax (registered trademark) (e.g. "Pebax 2533")" available from Arkema K. K.; a thermoplastic polyester elastomer having a trade name of "Hytrel (registered trademark) (e.g. "Hytrel 3548", "Hytrel 4047")" available from Du Pont-Toray Co., Ltd.; a thermoplastic polyurethane elastomer having a trade name of "Elastollan (registered trademark) (e.g. "Elastollan XNY97A")" available from BASF Japan Ltd.; and a thermoplastic styrene elastomer having a trade name of "Rabalon (registered trademark)" or a thermoplastic polyester elastomer having a trade name of "Primalloy" available from Mitsubishi Chemical Corporation. The cover material may be used solely, or two or more of them may be used in combination.

Among them, as the resin component constituting the cover, the polyurethane resin or the ionomer resin is preferable, the polyurethane resin is particularly preferable. In case of using the polyurethane resin in the resin component constituting the cover, the amount of the polyurethane resin in the resin component is preferably 50 mass % or more, more preferably 70 mass % or more, and even more preferably 90 mass % or more. In case of using the ionomer resin in the resin component constituting the cover, the amount of the ionomer resin in the resin component is preferably 50 mass % or more, more preferably 70 mass % or more, and even more preferably 90 mass % or more.

The polyurethane may be either a thermoplastic polyurethane or a thermosetting polyurethane. The thermoplastic polyurethane is a polyurethane exhibiting plasticity by heating and generally means a polyurethane having a linear chain structure of a high-molecular weight to a certain extent. On the other hand, the thermosetting polyurethane (two-component curing type polyurethane) is a polyurethane obtained by a reaction between a low molecular weight urethane prepolymer and a curing agent (chain extender) when molding the cover. The thermosetting polyurethane includes a polyurethane having a linear structure and a polyurethane having a three-dimensional crosslinked structure, which are obtained by controlling the number of the functional group of the prepolymer or curing agent (chain extender) being used. The polyurethane is preferably the thermoplastic elastomer.

In addition to the above-described resin component, the cover may further contain a pigment component such as a white pigment (e.g. titanium oxide), a blue pigment and a red pigment, a density adjusting agent such as calcium carbonate and barium sulfate, a dispersant, an antioxidant, an ultraviolet absorber, a light stabilizer, or a fluorescent material or fluorescent brightener, as long as they don't impair the performance of the cover.

Examples of the method of molding the cover composition into the cover include, but are not limited to, a method of injection molding the cover composition directly onto the core; and a method of molding the cover composition into a hollow shell, covering the core with a plurality of the hollow shells and performing compression molding (preferably a method of molding the cover composition into a hollow half-shell, covering the core with two of the half-shells and performing compression molding). The golf ball body having the cover formed thereon is ejected from the mold, and is preferably subjected to surface treatments such as deburring, cleaning and sandblast where necessary. In addition, if desired, a mark may be formed.

The total number of the dimples formed on the cover is preferably 200 or more and 500 or less. If the total number of the dimples is less than 200, the dimple effect is hardly obtained. In addition, if the total number of the dimples exceeds 500, the dimple effect is hardly obtained because the size of the respective dimple is small. The shape (shape in a plan view) of the dimples formed on the cover includes, without any limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

In the case that the golf ball is a three-piece golf ball, a four-piece golf ball or a multi-piece golf ball composed of five or more pieces, examples of the material of the intermediate layer disposed between the core and the outermost cover include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product prepared by neutralizing at least a part of carboxyl groups in a copolymer composed of ethylene and an $\alpha,\beta$-unsaturated carboxylic acid with a metal ion; and a product prepared by neutralizing at least a part of carboxyl groups in a ternary copolymer composed of ethylene, an $\alpha,\beta$-unsaturated carboxylic acid and an $\alpha,\beta$-unsaturated carboxylic acid ester with a metal ion. The intermediate layer may further contain a density adjusting agent such as barium sulfate and tungsten, an antioxidant, and a pigment. It is noted that the intermediate layer is sometimes referred to as an inner cover or outer core, depending on the construction of the golf ball.

The golf ball preferably has a diameter ranging from 40 mm to 45 mm. In light of satisfying the regulation of US Golf Association (USGA), the diameter is preferably 42.67 mm or more. In light of prevention of air resistance, the diameter is preferably 44 mm or less, more preferably 42.80 mm or less. The golf ball preferably has a mass of 40 g or more and 50 g or less. In light of obtaining greater inertia, the mass is preferably 44 g or more, more preferably 45.00 g or more. In light of satisfying the regulation of USGA, the mass is preferably 45.93 g or less.

When the golf ball has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard and thus the shot feeling thereof is better. On the other hand, if the compression deformation amount is 4.0 mm or less, the resilience is greater.

FIG. 1 is a partially cutaway cross-sectional view of a golf ball 1 according to one embodiment of the present invention. The golf ball 1 comprises a spherical core 2, a cover 3 covering the spherical core 2, and a paint film 4 formed on a surface of the cover 3. The paint film 4 is composed of an inner layer 41 and an outer layer 42. A plurality of dimples 31 are formed on the surface of the cover 3. Other portions than the dimples 31 on the surface of the cover 3 are land 32.

EXAMPLES

Next, the present invention will be described in detail by way of examples. However, the present invention is not limited to the examples described below. Various changes and modifications without departing from the spirit of the present invention are included in the scope of the present invention.

[Measuring Method]
(1) Core Hardness (Shore C Hardness)

The hardness measured at the surface of the core was adopted as the surface hardness of the core. In addition, the core was cut into two hemispheres to obtain a cut plane, and the hardness measured at the central point of the cut plane was adopted as the center hardness of the core. The hardness was measured with an automatic hardness tester (Digitest II available from Bareiss company) using a testing device of "Shore C".

(2) Slab Hardness (Shore D Hardness)

Sheets with a thickness of about 2 mm were produced by injection molding the intermediate layer composition or the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II available from Bareiss company) using a testing device of "Shore D".

(3) Compression Deformation Amount (Mm)

The deformation amount of the core or golf ball along the compression direction (shrinking amount of the core or golf ball along the compression direction), when applying a load from an initial load of 98 N to a final load of 1275 N to the core, was measured.

(4) Thickness of Paint Film (μm)

The golf ball was cut into two hemispheres, and the cross section of the paint film on the hemisphere was observed with a microscope (VHX-1000 available from Keyence Corporation) to obtain the thickness of the paint film.

Figure 2:
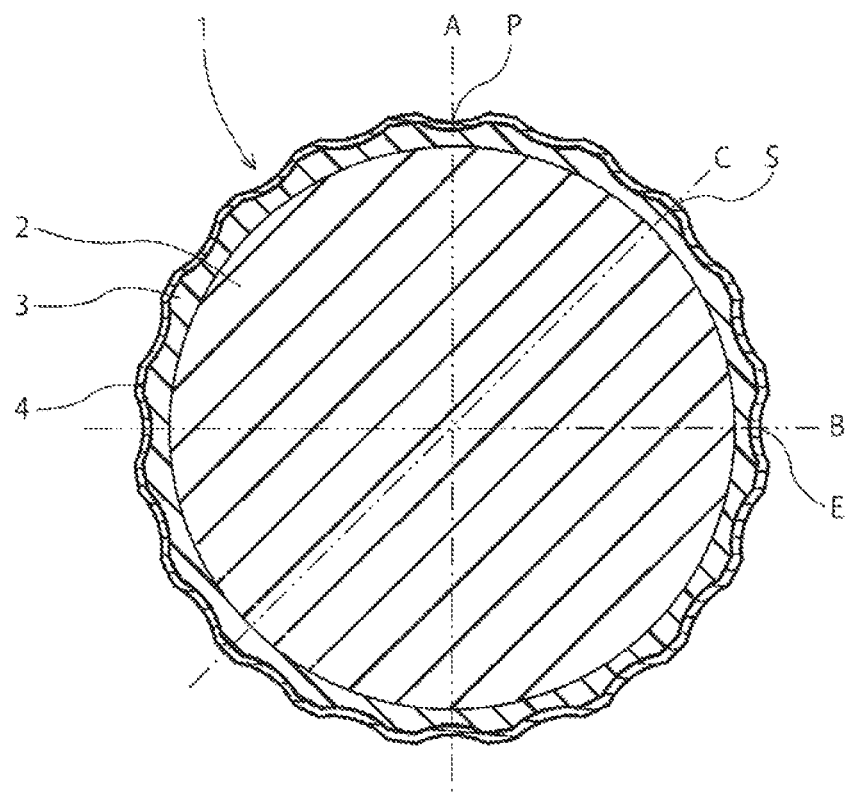
FIG. 2 is a schematic cross-sectional view illustrating a measuring location of a thickness of a paint film.

The measuring location of the film thickness will be explained by reference to FIGS. 2, and 3. FIG. 2 is a schematic figure of a cross section of a golf ball. As shown in FIG. 2, on the cross section of the golf ball, a straight line A passing a central point of the ball and a bottom of any dimple, a straight line B perpendicular to the straight line A, and a straight line C having an angle of 45° with the straight line A are prepared, and intersection points of these straight lines with the paint film surface are adopted as a pole P, an equator E and a shoulder S, respectively.

Figure 3:
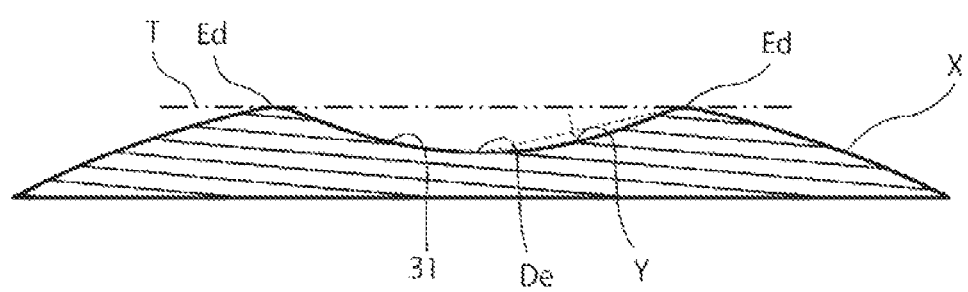
FIG. 3 is a schematic cross-sectional view illustrating a measuring location of a thickness of a paint film.

FIG. 3 is a schematic figure of a cross section passing a bottom De of a dimple 31 and a central point of a golf ball 1. The bottom De of the dimple 31 is the deepest location of the dimple 31. An edge Ed is a point of tangency of the dimple 31 with a tangent T, wherein the tangent T is drawn by connecting both sides of the dimple 31. A measuring location Y on an inclined plane is a point at which a perpendicular line intersects with the inclined plane of the dimple, wherein the perpendicular line is drawn from a midpoint of a straight line connecting the bottom De of the dimple and the edge Ed downward to the dimple 31. A measuring location X on a land is a midpoint between edges of adjacent dimples. It is noted that in the case that adjacent dimples contact each other so that no land exists, or in the case that the land is so narrow that the thickness is hard to be measured, the bottom, edge or inclined plane of the dimple is adopted as the measuring point.

In the measurement, test samples of six balls from three locations, i.e. the dimple where the pole P exists, the dimple near the equator E and the dimple near the shoulder S, were firstly prepared. Next, regarding each test piece (dimple), the thickness of the paint film at the bottom De, edge Ed, inclined plane Y and land X of the dimple was measured. Finally, measuring values of six balls were averaged, and the obtained average value was adopted as the thickness of the paint film.

(5) Contact Angle and Sliding Angle

The contact angle and sliding angle of the golf ball surface and sheet having the coating film formed thereon were measured.

A measuring sample sheet was prepared by forming a coating film on a slab formed from the cover composition. Specifically, pellets of the cover composition were sufficiently filled into a mold having a thickness of 2 mm, and compression molded at 170° C. for 5 minutes. After being cooled, the slab was ejected from the mold. The surface of the slab was treated with sandblast. After that, a spray coating method using an air gun was used to apply the paint such that the dried paint film has a desired thickness.

(5-1) Contact Angle

The contact angle was measured with a contact angle meter (DropMaster DM501, analysis software (FAMAS), available from Kyowa Interface Science, Inc.). As a dripping glass syringe, a syringe set 22G available from Kyowa Interface Science, Inc. was used.

In the measurement, firstly the software was started and the syringe was installed to the contact angle meter. Subsequently, the measuring sample was installed to a sample table such that the portion thereof on which water was dripped became level on the monitor. After that, 2 μL of water was dripped from the syringe, and 30 seconds later, the contact angle was measured. It is noted that the contact angle was measured by a θ/2 method. In the measurement for the golf ball, water was dripped at the center of the dimple having a maximum diameter.

(5-2) Sliding Angle

The sliding angle was measured with a sliding contact angle meter (DMo-501SA available from Kyowa Interface Science, Inc.). The measuring conditions were as follows. In the measurement for the golf ball, water was dripped at the center of the dimple having a maximum diameter.

Measuring method: sliding method
Analysis method: curve fitting method (section: 60 dots)
Field of view: WIDE1
Water amount: 19±1 μL (needle being used: stainless steel needle 15G)
Sliding condition: 0 to 90° (2.0° per second, continuous tilting)
Sliding and moving decision distance: tilt angle when moving at least 3 dots In addition, the adhesion energy (mJ/m$^2$) was calculated from the measuring values of the golf ball, using the following formula. It is noted that r is a contact radius, w is a droplet mass, g is gravitational acceleration, and a is a sliding angle.

$$\text{Adhesion energy} = (w \times g \times \sin\alpha)/(2 \times \pi \times r)$$

(6) Indentation Depth of Paint Film

In the measurement of the indentation depth, the golf ball was cut to obtain a hemisphere. On the hemisphere, the cross section passing the central point of the golf ball was exposed. The cross section included the cross section of the paint film. The cross section of the hemisphere was made level with a cryomicrotome. The indenter of a nanoindenter was allowed to touch the cross section of the paint film, and pressed in a direction perpendicular to the cross section. The indenter travelled by the pressing. The load of the indenter and the traveling distance were measured. The conditions when conducting the measurement were as follows.

Nanoindenter: "ENT-2100" available from Elionix Inc.
Temperature: 30° C.
Indenter: Berkovich indenter (65.03° As (h)=26.43h2)
Division number: 500 steps, step interval: 20 msec (100 mgf)

The load of the indenter was slowly increased until it reached 50 mgf. The travelling distance (nm) of the indenter when the load was 30 mgf was measured as the indentation depth.

(7) Driver Shots

A driver (trade name: "SRIXON Z765 Ltd", shaft hardness: X, loft angel: 8.5°, available from Sumitomo Rubber Industry Co. Ltd.) was installed on a swing machine available from Golf Laboratories, Inc. The golf ball was hit at a head speed of 50 m/sec, and the spin rate, ball speed and flight distance from the launch point to the stop point were measured. In addition, the measurement was respectively conducted on a sunny day and on a rainy day. The measurement was conducted twelve times for each golf ball, and the average value thereof was calculated.

1. Production of Spherical Core

The rubber composition having the formulation shown in Table 1 was kneaded, and heat-pressed at 150° C. for 19 minutes in upper and lower molds, each having a hemispherical cavity, to obtain a spherical core having a diameter of 39.7 mm. It is noted that the amount of barium sulfate was adjusted such that the ball had a mass of 45.6 g.

TABLE 1

Spherical core

| | | |
|---|---|---|
| Formulation of rubber composition (parts by mass) | Polybutadiene rubber | 100 |
| | Zinc acrylate | 30.5 |
| | Zinc oxide | 10 |
| | Barium sulfate | Appropriate amount |
| | Bis(pentabromophenyl) disulfide | 0.3 |
| | Dicumyl peroxide | 0.7 |
| | Benzoic acid | 2 |
| Molding conditions | Temperature (° C.) | 150 |
| | Time (min) | 19 |
| Physical properties of core | Compression deformation amount (mm) | 3.3 |
| | Center hardness (Shore C) | 53 |
| | Surface hardness (Shore C) | 80 |
| | Hardness difference (surface-center) (Shore C) | 27 |

Polybutadiene rubber: "BR730 (high-cis polybutadiene)" available from JSR Corporation Zinc acrylate: "ZN-DA90S" available from Nihon Jyoryu Kogyo Co., Ltd.

Zinc oxide: "Ginrei R" available from Toho Zinc Co., Ltd.

Barium sulfate: "Barium Sulfate BD" available from Sakai Chemical Industry Co., Ltd.

Bis(pentabromophenyl) disulfide: available from Kawaguchi Chemical Industry Co., Ltd.

Dicumyl peroxide: "Percumyl (registered trademark) D" available from NOF Corporation Benzoic acid: available from Emerald Kalama Chemical Co., Ltd.

2. Preparation of Intermediate Layer Composition and Cover Composition

According to the formulations shown in Tables 2 and 3, the materials were mixed with a twin-screw kneading extruder to prepare the intermediate layer compositions and the cover compositions in a pellet form. The extruding conditions were a screw diameter of 45 mm, a screw rotational speed of 200 rpm, and screw L/D=35, and the mixture was heated to 160° C. to 230° C. at the die position of the extruder.

TABLE 2

Intermediate layer composition

| | |
|---|---|
| Himilan AM7329 | 55 |
| Himilan 1555 | 45 |
| Barium sulfate | Appropriate amount |

TABLE 2-continued

Intermediate layer composition

| | |
|---|---|
| Titanium dioxide | 3 |
| Slab hardness (Shore D) | 62 |

Himilan (registered trademark) AM7329: zinc ion-neutralized ethylene-methacrylic acid copolymer ionomer resin available from Du Pont-Mitsui Polychemicals Co., Ltd.

Himilan 1555: sodium ion-neutralized ethylene-methacrylic acid copolymer ionomer resin available from Du Pont-Mitsui Polychemicals Co., Ltd.

TABLE 3

Cover composition

| | |
|---|---|
| Elastollan NY80A | 100 |
| Titanium dioxide | 4 |
| Ultramarine blue | 0.04 |
| Slab hardness (Shore D) | 27 |

Elastollan (registered trademark) NY80A: thermoplastic polyurethane elastomer available from BASF Japan Corporation

3. Molding of Intermediate Layer

The intermediate layer composition obtained above was directly injection molded onto the spherical core obtained above to form the intermediate layer (thickness: 1.0 mm) covering the spherical core.

4. Production of Reinforcing Layer

A reinforcing layer composition (trade name "Polin (registered trademark) 750LE" available from Shinto Paint Co., Ltd.) having a two-component curing type epoxy resin as the base resin was prepared. The base agent contains a bisphenol A type solid epoxy resin in an amount of 30 parts by mass, and a solvent in an amount of 70 parts by mass. The curing agent contains a modified polyamide amine in an amount of 40 parts by mass, titanium dioxide in an amount of 5 parts by mass, and a solvent in an amount of 55 parts by mass. The mass ratio of the base agent to the curing agent was 1/1. The reinforcing layer composition was applied to the surface of the intermediate layer with an air gun, and kept for 12 hours in an atmosphere of 23° C., to form the reinforcing layer. The thickness of the reinforcing layer was 7 μm.

5. Molding of Cover

The cover composition in a pellet form was charged into each of the depressed part of the lower mold for molding half shells one by one, and a pressure was applied to mold half shells. The spherical body having the reinforcing layer formed thereon was concentrically covered with two of the half shells. The spherical body and the half shells were charged into a final mold provided with a plurality of pimples on the cavity surface. The cover (thickness: 0.5 mm) was molded by compression molding, to obtain golf ball bodies. A plurality of dimples having an inverted shape of the pimples were formed on the cover.

6. Preparation of Polyol Composition 6-1. Polyol Composition No. 1 (Polyrotaxane Composition)

50 parts by mass of polyrotaxane ("SeRM (registered trademark) super polymer SH3400P (polyrotaxane having at least a part of hydroxyl groups of cyclodextrin thereof being modified with caprolactone chain via —O—$C_3H_6$—O— group, linear molecule: polyethylene glycol; blocking group: adamantyl group; molecular weight of linear molecule: 35,000; hydroxyl value of polyrotaxane: 72 mgKOH/g; total molecular weight of polyrotaxane: 700,000 in weight average molecular weight)") available from Advanced Softmaterials Inc.), 28 parts by mass of polycaprolactone polyol ("Placcel (registered trademark) 308" available from Daicel Chemical Industries, Ltd., hydroxyl value: 190 to 200 mgKOH/g), 22 parts by mass of vinyl chloride-vinyl acetate-vinyl alcohol copolymer ("Solbin (registered trademark) AL" available from Nissin Chemical Industry Co., Ltd., hydroxyl value: 63.4 mgKOH/g), 0.1 part by mass of modified silicone (DBL-C31 available from Gelest, Inc.), 0.01 part by mass of dibutyl tin dilaurate, and 100 parts by mass of a solvent (a mixed solvent of xylene/methyl ethyl ketone=70/30 (mass ratio)) were mixed to prepare the polyol composition No. 1.

6-2. Polyol Composition No. 2 (Urethane Polyol)

As the first polyol component, polytetramethylene ether glycol (PTMG, number average molecular weight: 650) and trimethylolpropane (TMP) were dissolved in a solvent (toluene and methyl ethyl ketone). It is noted that the molar ratio (PTMG: TMP) was 1.8: 1.0. Dibutyltin dilaurate which was used as a catalyst was added therein in an amount of 0.1 mass % with respect to the total amount of the base material. While keeping the temperature of the obtained polyol solution at 80° C., isophorone diisocyanate (IPDI), as the first polyisocyanate component, was added dropwise to the polyol solution and mixed. It is noted that the molar ratio (NCO/OH) of the NCO group in the polyisocyanate component to the OH group in the polyol component was 0.6. After finishing the addition of isophorone diisocyanate, stirring was continued until the isocyanate group no longer existed. Then, the reaction liquid was cooled to a room temperature to prepare the urethane polyol (solid content: 30 mass %). The amount of PTMG in the obtained polyol composition No. 2 was 67 mass %, the hydroxyl value of the solid component was 67.4 mgKOH/g, and the weight average molecular weight of the urethane polyol was 4867.

7. Preparation of Polyisocyanate Composition 7-1. Polyisocyanate Composition No. 1

100 parts by mass of the biuret-modified product of hexamethylene diisocyanate (Duranate 21S-75E (NCO amount: 15.5 mass %) available from Asahi Kasei Chemicals Corporation) and 100 parts by mass of methyl ethyl ketone were mixed.

7-2. Polyisocyanate Composition No. 2

30 parts by mass of the isocyanurate-modified product of hexamethylene diisocyanate (Duranate (registered trademark) TKA-100 (NCO amount: 21.7 mass %) available from Asahi Kasei Chemicals Corporation), 30 parts by mass of the biuret-modified product of hexamethylene diisocyanate (Duranate 21S-75E (NCO amount: 15.5 mass %) available from Asahi Kasei Chemicals Corporation), and 40 parts by mass of the isocyanurate-modified product of isophorone diisocyanate (Desmodur (registered trademark) Z 4470 (NCO amount: 11.9 mass %) available from Bayer Co., Ltd.) were mixed. As the solvent, a mixed solvent of methyl ethyl ketone, n-butyl acetate and toluene was added therein to adjust the concentration of the polyisocyanate component to 60 mass %.

8. Paint

The formulations of the paint are shown in Table 4. It is noted that the polyol composition was adopted as the base agent and the polyisocyanate composition was adopted as the curing agent.

TABLE 4

| | | Paint No. | 1 | 2 | 3 | 4 | 5 | 6 | 7 |
|---|---|---|---|---|---|---|---|---|---|
| Formulation | Resin component | Polyol composition No. | No. 1 | No. 1 | No. 1 | No. 1 | No. 2 | No. 2 | No. 1 |
| | | Polyisocyanate composition No. | No. 1 | No. 1 | No. 1 | No. 1 | No. 2 | No. 2 | No. 1 |
| | | Mass ratio (base agent/curing agent) | 100/10.7 | 100/10.7 | 100/10.7 | 100/10.7 | 100/29 | 100/14.7 | 100/10.7 |
| | | Molar ratio (NCO/OH) | 1.2/1.0 | 1.2/1.0 | 1.2/1.0 | 1.2/1.0 | 1.2/1.0 | 0.6/1.0 | 1.2/1.0 |
| | Filler | Type | Radiolite | zeolite | Talc | — | — | — | Acrylic bead |
| | | Feature | Porous | Porous | Non-porous | — | — | — | Non-porous |
| | | $SiO_2$ amount (mass %) | 80 | 69 to 70 | — | — | — | — | — |
| | | Amount (parts by mass) with respect to 100 parts by mass of resin component (solid component) | 100 | 100 | 100 | — | — | — | 70 |
| Physical properties of paint | | Water sliding angle B2 (sheet: 20 µl) (°) | 44 | 43 | 50 | 90 | 49 | 56 | 63 |
| | | Water contact angel A2 (sheet: 2 µl) (°) | 103 | 104 | 105 | 101 | 77 | 85 | 107 |

Radiolite: "Radiolite F" (volume average particle size: 7 µm, bulk density: 0.40 g/cm³) available from Showa Chemical Industry Co., Ltd.

Zeolite: "Molecular sieve 13X POWDER" (volume median particle size: 8.7 µm, bulk density: 0.5 g/cm³) available from Union Showa K.K.

Talc: "P8" (volume average particle size: 3.3 µm, bulk density: 0.12 g/cm³) available from Nippon Talc Co., Ltd.

9. Formation of Paint Film

The surface of the golf ball bodies obtained above was treated with sandblast and marked. The paint was applied with a spray gun, and dried for 24 hours in an oven at 40° C. to obtain golf balls having a diameter of 42.7 mm and a mass of 45.6 g. The application of the paint was conducted as follows. The golf ball body was placed in a rotating member provided with a prong, and the rotating member was allowed to rotate at 300 rpm. The application of the paint was conducted by spacing a spray distance (7 cm) between the air gun and the golf ball body, and moving the air gun in an up and down direction. The painting interval in the overpainting operation was set to 1.0 second. The application of the paint was conducted under the spraying conditions of overpainting operation: twice, spraying air pressure: 0.15 MPa, compressed air tank pressure: 0.10 MPa, painting time per one application: one second, atmosphere temperature: 20° C. to 27° C., and atmosphere humidity: 65% or less. It is noted that in the case that the paint film was multi-layered, after the inner layer paint applied to the golf ball body was fully dried, the outer layer paint was applied. Evaluation results of the obtained golf balls are shown in Table 5.

TABLE 5

| | Golf ball No. | | 1 | 2 | 3 | 4 | 5 | 6 | 7 |
|---|---|---|---|---|---|---|---|---|---|
| Paint film | Inner layer | Paint No. | — | 5 | 5 | 5 | 5 | 5 | 5 |
| | | Thickness (μm) | — | 10 | 10 | 10 | 10 | 10 | 10 |
| | Outer layer | Paint No. | 1 | 2 | 3 | 6 | 5 | 4 | 7 |
| | | Thickness (μm) | 10 | 10 | 10 | 10 | 10 | 10 | 10 |
| Evaluation | Compression deformation amount (mm) | | 2.8 | 2.8 | 2.8 | 2.8 | 2.8 | 2.8 | 2.8 |
| | Water contact angel A1 (°) | | 87 | 89 | 90 | 60 | 64 | 86 | 90 |
| | Water sliding angle B1 (°) | | 38 | 40 | 46 | 59 | 54 | 57 | 57 |
| | Adhesion energy (mJ/m$^2$) | | 8 | 8 | 9 | 12 | 10 | 11.9 | 11.9 |
| | Indentation depth (nm) | | 2300 | 2300 | 2300 | 1500 | 390 | 2300 | 2300 |
| | Driver shots on | Ball speed (m/s) | 73.0 | 73.0 | 73.0 | 73.0 | 73.0 | 73.0 | 73.0 |
| | sunny day | Flight distance (m) | 247 | 247 | 247 | 247 | 247 | 247 | 247 |
| | Driver shots on | Ball speed (m/s) | 73.0 | 72.8 | 72.6 | 72.1 | 72.3 | 72.2 | 72.4 |
| | rainy day | Flight distance (m) | 235 | 232 | 229 | 220 | 225 | 222 | 226 |
| | Ball speed loss on rainy day (m/s) | | 0 | 0.2 | 0.4 | 0.9 | 0.7 | 0.8 | 0.6 |
| | Flight distance loss on rainy day (m) | | 12 | 15 | 18 | 27 | 22 | 25 | 21 |

The golf balls No. 1 to 3 are the cases that the water contact angle A1 is 70° or more and the water sliding angle B1 is less than 50°, or the cases that the water contact angle A2 is 90° or more and the water sliding angle B2 is less than 52°. These golf balls No. 1 to 3 show a small loss in the ball speed and a reduction in flight distance loss on a rainy day.

The golf balls No. 4 to 7 are the cases that the water sliding angle B1 is more than 50°. These golf balls No. 4 to 7 show a great loss in the ball speed and a great flight distance loss on a rainy day.

This application is based on Japanese patent application No. 2018-143746 filed on Jul. 31, 2018, the content of which is hereby incorporated by reference.

The invention claimed is:

1. A golf ball comprising a golf ball body and a paint film covering the golf ball body, wherein
the paint film is formed from a paint containing a base resin and a silicon-containing filler,
the paint film contains the silicon-containing filler,
the silicon-containing filler has a volume average particle size in a range from 0.51 μm to 30 μm,
an amount of the silicon-containing filler ranges from 30 parts by mass to 200 parts by mass with respect to 100 parts by mass of the base resin, and
a paint film surface of the golf ball has a water contact angle A1 of 70° or more and a water sliding angle B1 of less than 50°.

2. The golf ball according to claim 1, wherein the water contact angle A1 is 75° or more.

3. The golf ball according to claim 1, wherein the water sliding angle B1 is 45° or less.

4. The golf ball according to claim 1, wherein the silicon-containing filler is a porous filler.

5. The golf ball according to claim 4, wherein the porous filler contains $SiO_2$ in an amount of 50 mass % or more.

6. The golf ball according to claim 4, wherein the porous filler is at least one member selected from the group consisting of diatomite, zeolite and pearlite.

7. The golf ball according to claim 1, wherein the silicon-containing filler has a bulk density in a range from 0.2 g/cm$^3$ to 1.0 g/cm$^3$.

8. The golf ball according to claim 1, wherein the base resin is a urethane resin.

9. A golf ball comprising a golf ball body and a paint film covering the golf ball body, wherein
the paint film is formed from a paint containing a base resin and a silicon-containing filler,
the paint film contains the silicon-containing filler,
the silicon-containing filler is a porous filler,
an amount of the silicon-containing filler ranges from 30 parts by mass to 200 parts by mass with respect to 100 parts by mass of the base resin, and
a paint film surface of the golf ball has a water contact angle A1 of 70° or more and a water sliding angle B1 of less than 50°.

10. The golf ball according to claim 9, wherein the water contact angle A1 is 75° or more.

11. The golf ball according to claim 9, wherein the water sliding angle B1 is 45° or less.

12. The golf ball according to claim 9, wherein the porous filler contains $SiO_2$ in an amount of 50 mass % or more.

13. The golf ball according to claim 9, wherein the porous filler is at least one member selected from the group consisting of diatomite, zeolite and pearlite.

14. The golf ball according to claim 9, wherein the base resin is a urethane resin.

15. A golf ball comprising a golf ball body and a paint film covering the golf ball body, wherein
the paint film is formed from a paint containing a base resin and a silicon-containing filler,
the paint film contains the silicon-containing filler,
the silicon-containing filler has a volume average particle size in a range from 0.5 μm to 30 μm,
the silicon-containing filler has a bulk density in a range from 0.2 g/cm$^3$ to 1.0 g/cm$^3$, and
a paint film surface of the golf ball has a water contact angle A1 of 70° or more and a water sliding angle B1 of less than 50°.

16. The golf ball according to claim 15, wherein the water contact angle A1 is 75° or more.

17. The golf ball according to claim 15, wherein the water sliding angle B1 is 45° or less.

18. The golf ball according to claim 15, wherein the silicon-containing filler is a porous filler, and the porous filler contains $SiO_2$ in an amount of 50 mass % or more.

19. The golf ball according to claim 15, wherein the silicon-containing filler is a porous filler, and the porous filler is at least one member selected from the group consisting of diatomite, zeolite and pearlite.

20. The golf ball according to claim 15, wherein an amount of the silicon-containing filler ranges from 20 parts by mass to 200 parts by mass with respect to 100 parts by mass of the base resin.

* * * * *